United States Patent
Murakami et al.

(10) Patent No.: US 8,752,874 B2
(45) Date of Patent: Jun. 17, 2014

(54) ROBOT HAND

(75) Inventors: Kenjiro Murakami, Matsumoto (JP); Daisuke Kirihara, Chino (JP)

(73) Assignee: Seiko Epson Corporation (JP)

( * ) Notice: Subject to any disclaimer, the term of this patent is extended or adjusted under 35 U.S.C. 154(b) by 1 day.

(21) Appl. No.: 13/348,140

(22) Filed: Jan. 11, 2012

(65) Prior Publication Data

US 2012/0175903 A1    Jul. 12, 2012

(30) Foreign Application Priority Data

Jan. 12, 2011  (JP) ................................. 2011-003721

(51) Int. Cl.
*B66C 1/42* (2006.01)

(52) U.S. Cl.
USPC ........................................ 294/119.1; 901/38

(58) Field of Classification Search
CPC .... B65G 47/90; B25J 15/0253; B25J 15/103; B25J 15/0009; B25J 15/026
USPC ........................... 901/38, 39; 294/119.1, 213; 269/104–125
See application file for complete search history.

(56) References Cited

U.S. PATENT DOCUMENTS

| | | | |
|---|---|---|---|
| 4,579,380 A * | 4/1986 | Zaremsky et al. | 294/119.1 |
| 5,127,695 A * | 7/1992 | Zoeten | 294/67.33 |
| 5,150,937 A * | 9/1992 | Yakou | 294/119.1 |
| 5,161,847 A * | 11/1992 | Yakou | 294/119.1 |
| 5,671,962 A | 9/1997 | Otsuka et al. | |
| 5,829,811 A * | 11/1998 | Skinner, II | 294/197 |
| 6,394,521 B1 * | 5/2002 | Bertini | 294/207 |
| 6,612,589 B2 * | 9/2003 | Saito | 279/110 |
| 7,300,084 B2 * | 11/2007 | Chae et al. | 294/119.1 |
| 2001/0028175 A1 * | 10/2001 | Thompson et al. | 294/119.1 |
| 2003/0189349 A1 * | 10/2003 | Risle et al. | 294/88 |
| 2012/0175904 A1 * | 7/2012 | Murakami et al. | 294/213 |
| 2012/0286536 A1 * | 11/2012 | Murakami et al. | 294/213 |
| 2012/0290133 A1 * | 11/2012 | Goto et al. | 700/258 |

FOREIGN PATENT DOCUMENTS

| | | |
|---|---|---|
| JP | 61-019577 | 1/1986 |
| JP | 05-060781 | 8/1993 |
| JP | 05-220687 | 8/1993 |
| JP | 07-164363 | 6/1995 |
| JP | 07-205080 | 8/1995 |
| JP | 08-090467 | 4/1996 |
| JP | 11-033969 | 2/1999 |
| JP | 2001-287182 | 10/2001 |
| JP | 2004-223676 | 8/2004 |
| JP | 2010-201538 | 9/2010 |

* cited by examiner

*Primary Examiner* — Saul Rodriguez
*Assistant Examiner* — Gabriela Puig
(74) *Attorney, Agent, or Firm* — Harness, Dickey & Pierce, P.L.C.

(57) ABSTRACT

A robot hand that changes a space between finger members provided apart from each other includes: moving members on which the finger members are vertically provided; a palm member including a moving mechanism for moving the moving members in a predetermined axial direction; and guide members that guide the movement of the moving members in the predetermined axial direction.

17 Claims, 6 Drawing Sheets

ROBOT HAND

BACKGROUND

1. Technical Field

The present invention relates to a robot hand that can grip an object.

2. Related Art

According to the progress of robot technologies in recent years, a large number of industrial robots are used in manufacturing sites of industrial products. Recently, practical use of robots in medical and nursing facilities is expected. Root hands for the robots to grip objects need to be capable of gripping objects having various sizes and shapes.

As a system adopted in a robot hand to grip an object, there are known a system for projecting plural finger members equivalent to human fingers from a palm member equivalent to a human palm and rotating the finger members with portions of the bases of the finger members as fulcrums to grip an object (e.g., JP-A-2010-201538) and a system for translating the bases of the finger members to reduce a space between the finger members to thereby grip an object (e.g., JP-A-05-220687).

In the system for rotating the finger members with the bases of the finger members as the fulcrums, according to the size of an object to be gripped, angles of the finger members in contact with the object change. Therefore, the shapes and gripping force of finger members need to be changed according to the object. Therefore, the structure and the control of the robot hand are complicated. In this regard, in the system for translating the bases of the finger members, since the angles of the finger members in contact with an object does not change according to the size of the object, it is possible to simplify the structure and the control of the robot hand.

However, in the robot hand adopting the system for translating the bases of the finger members, it is difficult to apply the robot hand to work for gripping a small object. Reasons for the difficulty are as explained below. First, the work for gripping a small object is usually performed in a narrow work space. For example, in work for picking up small components and assembling the components in predetermined positions, the components to be assembled are often arranged close to one another in a narrow space. Usually, a space for placing the robot hand to pick up the components is limited. Further, when the picked-up components are attached, since the components are small, the components often have to be assembled in a narrow space. In the robot hand adopting the system for translating the bases of the finger members, the palm member is large because the palm member has to support the moving bases of the finger members. As a result, the robot hand is increased in size. This makes it difficult to apply the robot hand to work in a narrow work space.

SUMMARY

An advantage of some aspects of the invention is to provide a robot hand that is small and can be applied to work in a narrow work space, although the robot hand adopts the system for translating the bases of finger members to grip an object.

An aspect of the invention is directed to a robot hand that changes a space between finger members provided apart from each other to thereby grip an object, the robot hand including: moving members on which the finger members are vertically provided; a palm member including a moving mechanism for moving the moving members in a predetermined axial direction; and guide members that are vertically provided from the moving members and slide with respect to the palm member to thereby guide the movement of the moving members in the predetermined axial direction.

In the robot hand according to the aspect having such a configuration, the finger members for gripping an object are vertically provided from the moving members. The moving members are moved in the predetermined axial direction by the moving mechanism provided in the palm member, whereby the finger members are moved together with the moving members to grip the object. In order to move the moving members in the predetermined axial direction, besides the moving mechanism for transmitting driving force to the moving members and moving the moving members, the guide members for guiding the moving members to move in the predetermined axial direction are necessary. "Guide" means guiding the moving members while positioning the moving members such that a moving direction does not shift from the predetermined axial direction. In the robot hand according to the aspect, the guide members are vertically provided from the moving members. The guide members slide with respect to the palm member to thereby guide the moving members in the predetermined axial direction.

In such a structure, for example, when the moving members are moved away from the palm member in order to increase a space between the finger members, the guide members move according to the movement of the moving members while sliding with respect to the palm member. Therefore, it is possible to grip a large object. Conversely, when the moving members are moved close to the palm member in order to reduce the space between the finger members, the guide members move according to the movement of the moving members while sliding with respect to the palm member. When this motion is viewed from the palm member side, the guide members further retract and the size of the robot hand is reduced as the moving members move closer to the palm member. In this way, when the robot hand according to the aspect grips a small object, the size of the robot hand is reduced according to the size of the object. Therefore, the robot hand can be applied to work for gripping a small object in a narrow work space, although the robot hand adopts the system for translating the bases of finger members to grip an object.

In the robot hand according to the aspect, the moving members (therefore, the finger members provided in the moving members) may be moved as explained below. The palm member includes a center palm member including the moving mechanism, a first peripheral palm member provided to be movable in a first predetermined axial direction around the center palm member, and a second peripheral palm member provided to be movable in a second predetermined axial direction (a direction orthogonal to the first predetermined axial direction) around the center palm member. One moving member is provided between the center palm member and the first peripheral palm member and the other moving member is provided between the center palm member and the second peripheral palm member. In each of the moving members, at least two guide members are vertically provided in directions orthogonal to each other. One guide member and the first peripheral palm member slide each other and the other guide member and the second peripheral palm member slide each other, whereby the respective moving members are guided to move in the first predetermined axial direction and the second predetermined axial direction. The first peripheral palm member may be moved in the first predetermined axial direction or the second peripheral palm member may be moved in the second predetermined axial direction using the moving mechanism.

Consequently, the moving members (and the finger members) provided on both the sides of the first peripheral palm member can be moved in the first predetermined axial direction by moving the first peripheral palm member in the first predetermined axial direction. Similarly, the moving members (the finger members) provided on both the sides of the second peripheral palm member can be moved in the second predetermined axial direction by moving the second peripheral palm member in the second predetermined axial direction. The guide members that guide the motion of the moving members moving in the first predetermined axial direction or the second predetermined axial direction are vertically provided from the moving members. Therefore, when the moving members are moved close to the center palm member in order to grip a small object, the guide members also move according to the movement of the moving members and the size of the robot hand is reduced. Therefore, the robot hand can be applied to work for gripping a small object in a narrow work space, although the robot hand adopts the system for translating the bases of finger members to grip an object.

The robot hand according to the aspect adopts the system for translating the bases of finger members to grip an object. Therefore, the robot hand can grip a small object in a narrow work space while keeping an advantage that angles of the finger members in contact with an object do not change according to the size of the object. Therefore, such a robot hand can be suitably mounted on a robot that performs work for gripping a small object in a narrow work space.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
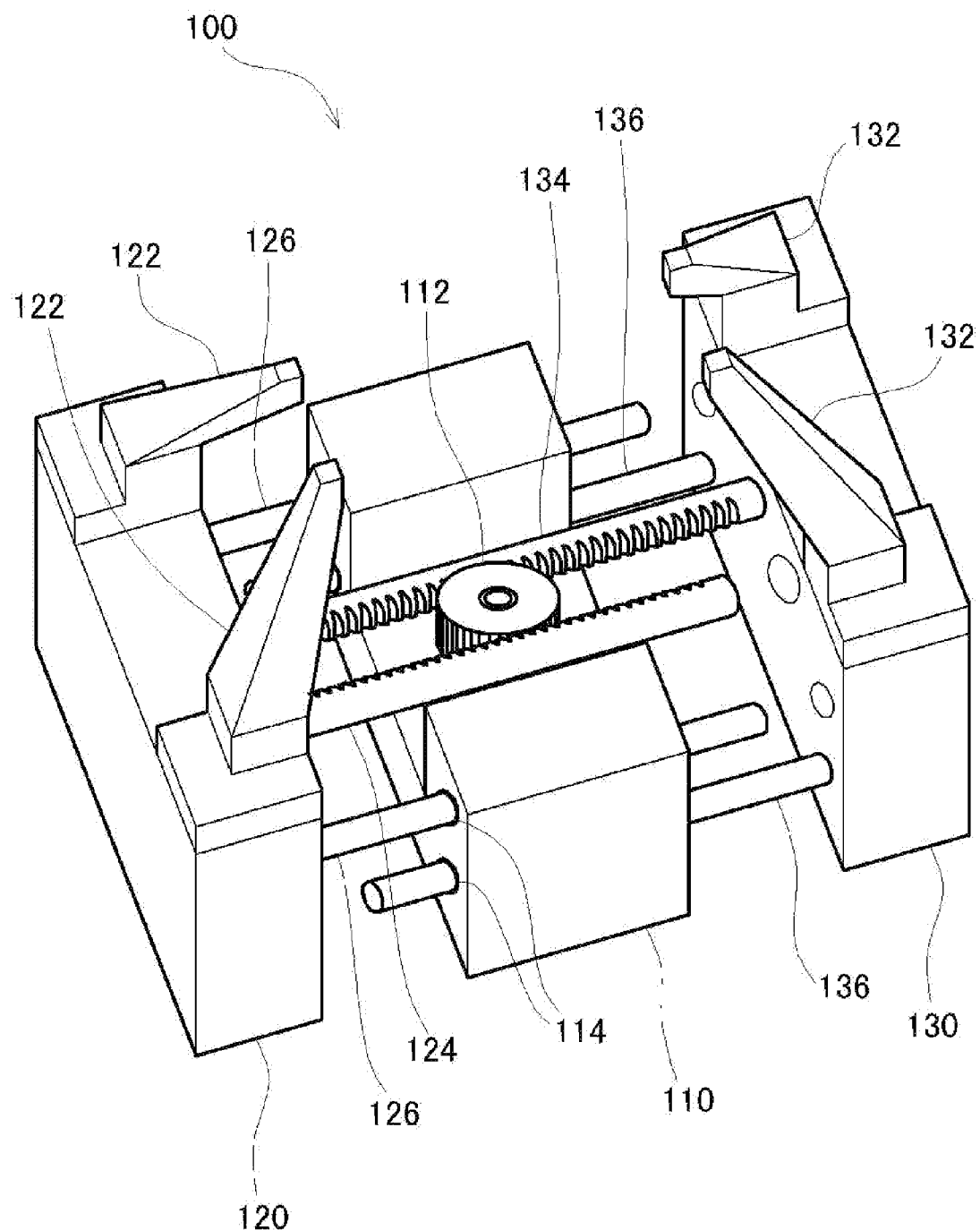
FIG. 1 is an explanatory diagram showing the structure of a robot hand according to an embodiment of the invention.

An embodiment is explained below according to the following order in order to clarify contents of the invention.
A. Structure of a robot hand according to this embodiment
B. Operation of the robot hand according to this embodiment
C. Modification
A. Configuration of the Robot Hand According to this Embodiment FIG. 1 is an explanatory diagram showing the structure of a robot hand 100 according to this embodiment. As shown in the figure, the robot hand 100 according to this embodiment roughly includes three sections. The section in the center includes a palm member 110 formed in a sectional shape in which a large groove is formed in the center of the upper side of a rectangular shape, a pinion gear 112 provided substantially in the center of the groove of the palm member 110, and a not-shown motor for rotating the pinion gear 112. Moving members 120 and 130 having a substantially rectangular parallelepiped shape are provided on the left and right of the palm member 110. Two finger members 122 are provided on the upper surface of the moving member 120. Two finger members 132 are provided on the upper surface of the moving member 130.

A rack 124 having cut teeth of a gear is vertically provided on the moving member 120. The rack 124 is meshed with the pinion gear 112. Columnar guide members 126 are vertically provided respectively from near both the ends of the moving member 120. The guide members 126 pierce through guide holes 114 provided in the palm member 110. The sizes of the guide members 126 and the guide holes 114 are set to appropriate sizes for allowing the guide members 126 to slide in the guide holes 114 and preventing play of the guide members 126. Similarly, a rack 134 having cut teeth of a gear and columnar two guide members 136 are vertically provided on the moving member 130. The rack 134 is meshed with the pinion gear 112. The two guide members 136 pierce through the guide holes 114 provided in the palm member 110. The sizes of the guide members 136 and the guide holes 114 are also set to appropriate sizes for allowing the guide members 136 to slide in the guide holes 114 and preventing play of the guide members 136.

Therefore, when the pinion gear 112 is rotated, the moving member 120 and the moving member 130 are moved by the rack 124 and the rack 134 that mesh with the pinion gear 112. A space between the finger members 122 and the finger members 132 changes. For example, in an example shown in FIG. 1, when the pinion gear 112 is rotated in the clockwise direction on the figure, the moving member 120 and the moving member 130 move away from each other. As a result, the space between the finger member 122 and the finger member 132 increases. When the pinion gear 112 is rotated in the counterclockwise direction on the figure, the space between the finger member 122 and the finger member 132 decreases.

Figure 2A:
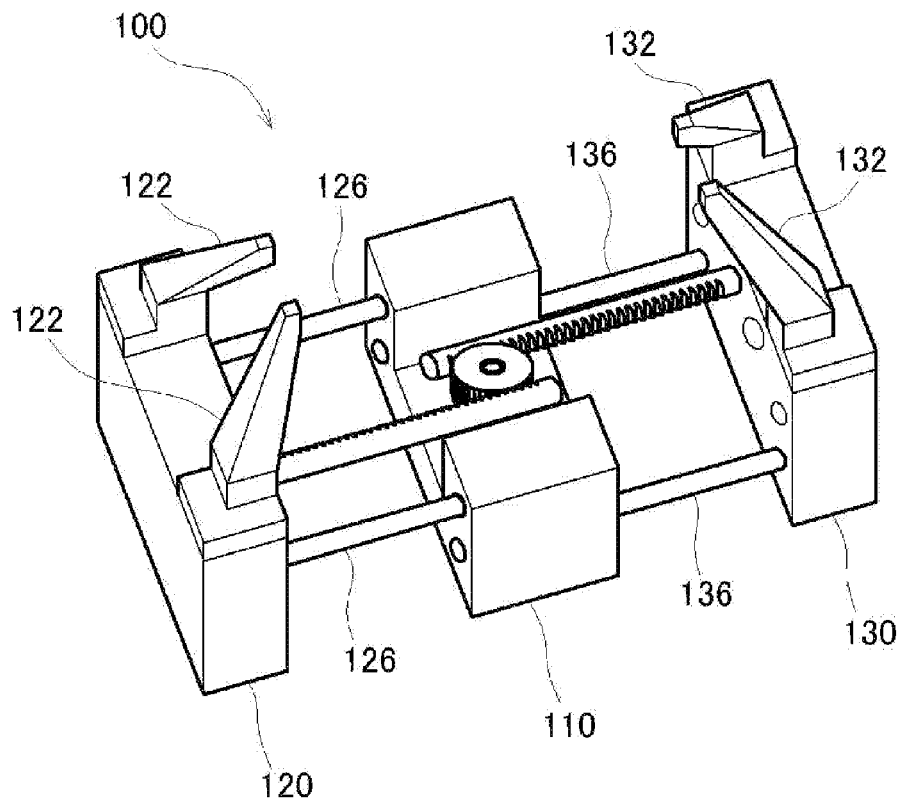
FIGS. 2A and 2B are explanatory diagrams showing the operation of the robot hand according to the embodiment.
Figure 2B:
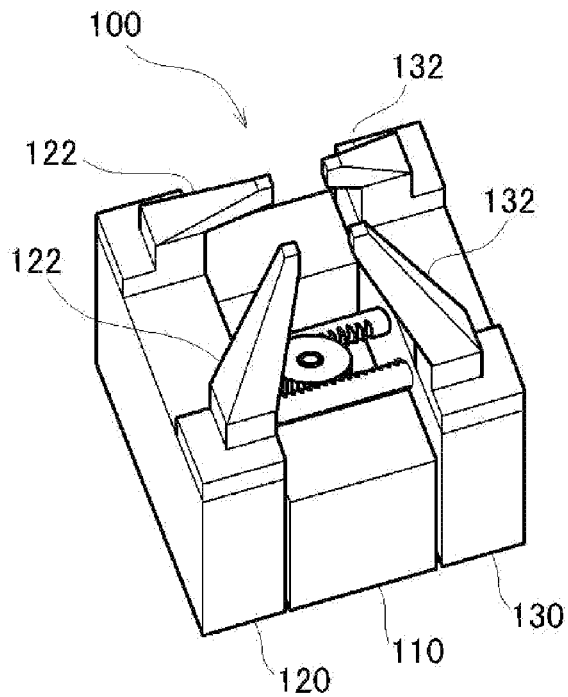

A direction in which the moving member 120 or the moving member 130 moves while being guided by the guide members 126 or the guide members 136 corresponds to "predetermined axial direction" according to the invention. The pinion gear 112, the rack 124, and the rack 134 for moving the moving member 120 or the moving member 130 and a motor or the like for rotating the pinion gear 112 correspond to "moving mechanism" according to the invention.
B. Operation of the Robot Hand According to this Embodiment FIGS. 2A and 2B are explanatory diagrams showing the operation of the robot hand 100 according to this embodiment. In FIG. 2A, a state in which a space between the moving member 120 and the moving member 130 is increased most is shown. In FIG. 2B, a state in which the space between the moving member 120 and the moving member 130 is reduced most is shown. FIG. 2A corresponds to gripping of a large object. FIG. 2B corresponds to gripping of a small object.

As explained above with reference to FIG. 1, the guide members 126 that guide the moving member 120 are vertically provided from the moving member 120 and slide in the guide holes 114 formed in the palm member 110. The guide members 136 that guide the moving member 130 are vertically provided from the moving member 130 and slide in the guide holes 114 formed in the palm member 110. Therefore, when the space between the moving member 120 and the moving member 130 is reduced in order to grip a small object, the guide members 126 and the guide members 136 slide. As shown in FIG. 2B, the size of the robot hand 100 is reduced.

Figure 3A:
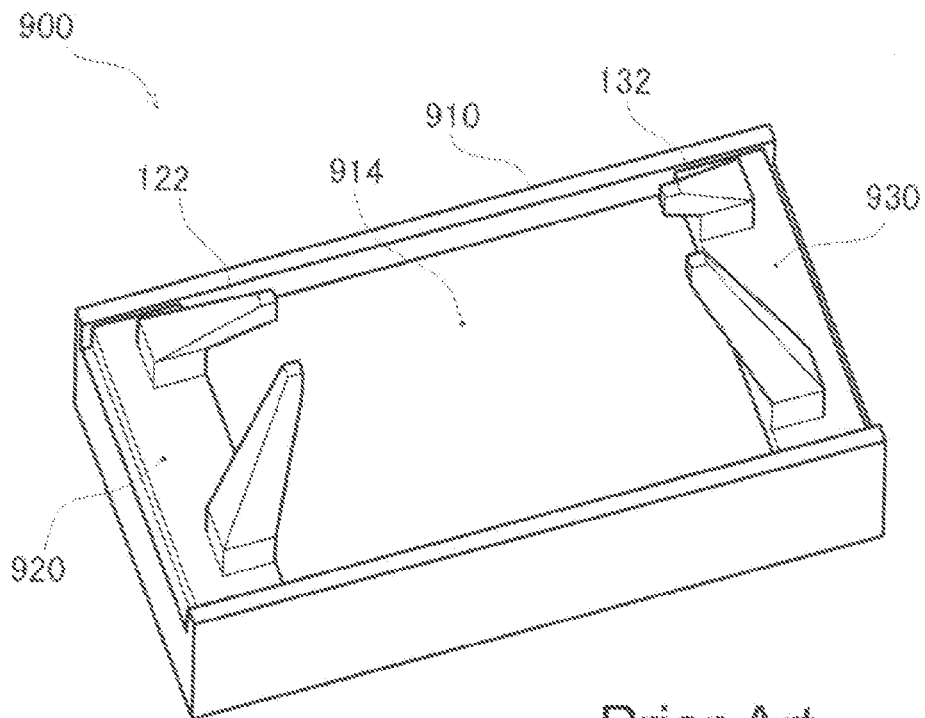
FIGS. 3A and 3B are explanatory diagrams showing the operation of a general robot hand.
Figure 3B:
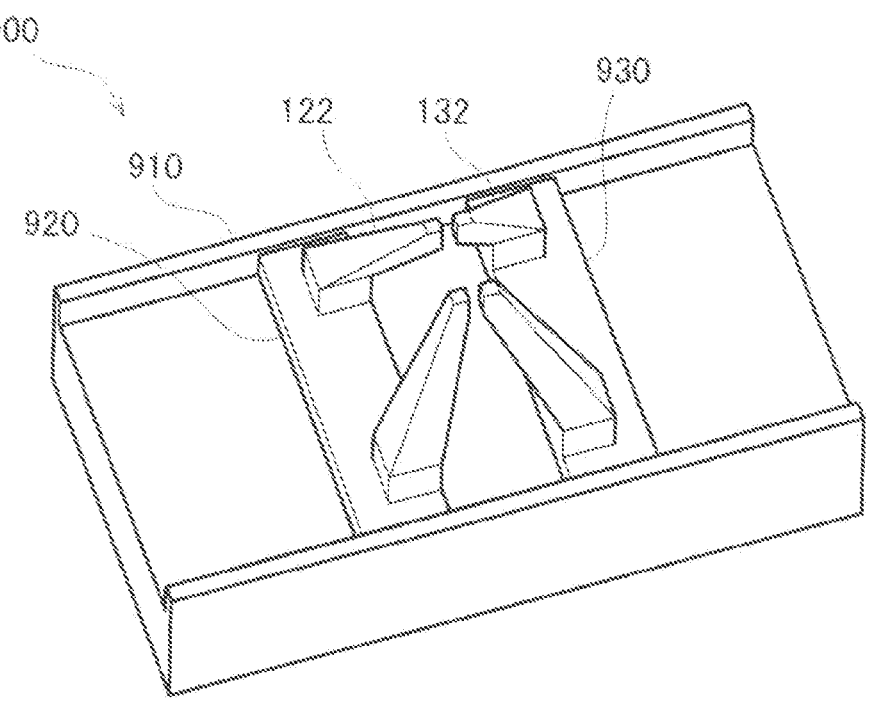

As reference, the operation of a general robot hand 900 adopting a system for translating the finger members 122 and 132 to grip an object is briefly explained. FIGS. 3A and 3B are explanatory diagrams showing the operation of the general robot hand 900. In the robot hand 900 shown in FIGS. 3A and 3B, a moving member 920 and a moving member 930 are provided on a large base 910. Two finger members 122 are provided on the moving member 920. Two finger members 132 are provided on the moving member 930. The moving member 920 and the moving member 930 slide in a guide groove 914 provided in the base 910. Therefore, the moving member 920 and the moving member 930 can increase and reduce a space between the members while being guided by the guide groove 914. In FIGS. 3A and 3B, a mechanism for moving the moving member 920 and the moving member 930 is not shown.

In FIG. 3A, a state in which the space between the moving member 920 and the moving member 930 is the largest is shown. In FIG. 3B, a state in which the space between the moving member 920 and the moving member 930 is the smallest is shown. As it is evident when FIG. 3A and FIG. 3B are compared, in the system for translating the moving member 920 provided with the finger members 122 and the moving member 930 provided with the finger members 132 to grip an object, the size of the robot hand 900 practically depends on the size of the base 910 that guides the moving member 920 and the moving member 930. Therefore, even if the space between the moving member 920 and the moving member 930 is narrowed to grip a small object, the size of the robot hand 900 is not reduced.

On the other hand, as shown in FIG. 2B, the size of the robot hand 100 is reduced in gripping a small object. Therefore, the robot hand 100 can be suitably used for work for gripping a small object in a narrow work space, although the robot hand 100 adopts the system for translating the moving member 120 provided with the finger members 122 and the moving member 130 provided with the finger members 132 to grip an object.

C. Modification

In the embodiment explained above, the finger members 122 and the finger members 132 can move only in one predetermined axial direction. However, it is also possible to move the finger members 122 and the finger members 132 in two axial directions orthogonal to each other. The robot hand 100 according to such a modification is explained below.

Figure 4:
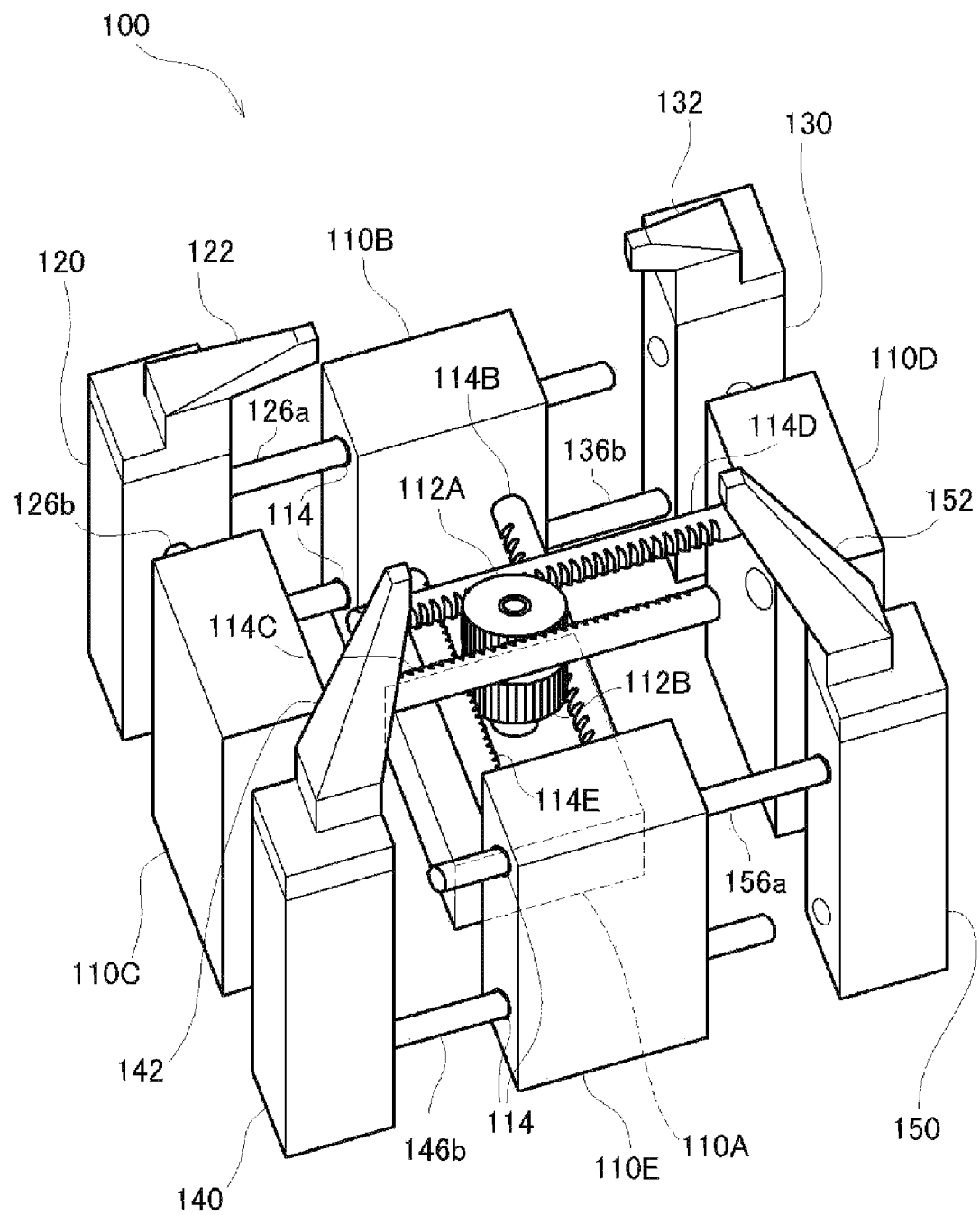
FIG. 4 is an explanatory diagram showing the structure of a robot hand according to a modification.

FIG. 4 is an explanatory diagram showing the structure of the robot hand 100 according to the modification. In the robot hand 100 explained above with reference to FIG. 1, the palm member 110 is one member. However, in the robot hand 100 according to the modification, the palm member 110 includes five members: a center palm member 110A provided in the center and four peripheral palm members 110B, 110C, 110D, and 110E arranged to form a cross around the center palm member 110A. The upper surface of the center palm member 110A is formed in substantially a square shape. A pinion gear 112A and a pinion gear 112B are provided be placed one on top of the other in two stages substantially in the center of the upper surface. A hollow tube is used for a driving shaft (not shown) for driving the pinion gear 112B on the lower side. A driving shaft (not shown) for the pinion gear 112A on the upper side passes on the inner side of the driving shaft for the pinion gear 112B. The driving shafts can be independently driven by not-shown motors.

On the peripheral palm members 110B, 110C, 110D, and 110E, racks 114B, 114C, 114D, and 114E having cut teeth of gears are vertically provided respectively. The rack 114C and the rack 114D provided in the peripheral palm member 110C and the peripheral palm member 110D opposed to each other are meshed with the pinion gear 112A on the upper side. The rack 114B of the peripheral palm member 110B and the rack 114E of the peripheral palm member 110E are meshed with the pinion gear 112B on the lower side.

Moving members 120, 130, 140, and 150 are provided among the four peripheral palm members 110B, 110C, 110D, and 110E. Finger members 122, 132, 142, and 152 are respectively provided on the upper surfaces of the moving members 120, 130, 140, and 150. Guide members are vertically provided respectively on the moving members 120, 130, 140, and 150 in directions orthogonal to one another. Specifically, a guide member 126a vertically provided toward the peripheral palm member 110B and a guide member 126b vertically provided toward the peripheral palm member 110C are provided in the moving member 120 provided between the peripheral palm member 110B and the peripheral palm member 110C. The guide member 126a is fit in the guide hole 114 provided in the peripheral palm member 110B. The guide member 126b is fit in the guide hole 114 provided in the peripheral palm member 110C.

Similarly, a guide member 136a (not shown) vertically provided toward the peripheral palm member 110D and a guide member 136b vertically provided toward the peripheral palm member 110B are provided in the moving member 130 provided between the peripheral palm member 110B and the peripheral palm member 110D. The guide member 136a is fit in the guide hole 114 provided in the peripheral palm member 110D. The guide member 136b is fit in the guide hole 114 provided in the peripheral palm member 110B. Guide members are provided in the same manner in the moving member 140 provided between the peripheral palm member 110C and the peripheral palm member 110E and the moving member 150 provided between the peripheral palm member 110D and the peripheral palm member 110E. Specifically, a guide member 146a (not shown) extending to the peripheral palm member 110C and a guide member 146b extending to the peripheral palm member 110E are vertically provided from the moving member 140. The guide member 146a is fit in the guide hole 114 provided in the peripheral palm member 110C. The guide member 146b is fit in the guide hole 114 provided in the peripheral palm member 110E. A guide member 156a extending to the peripheral palm member 110E and a guide member 156b (not shown) extending to the peripheral palm member 110D are vertically provided from the moving member 150. The guide member 156a is fit in the guide hole 114 provided in the peripheral palm member 110E. The guide member 156b is fit in the guide hole 114 provided in the peripheral palm member 110D.

The size of the guide holes 114 provided in the peripheral palm members 110B, 110C, 110D, and 110E is set to a size for allowing the guide members 126a, 126b, 136a, 136b, 146a, 146b, 156a, and 156b fit in the respective guide holes 114 to slide in the guide holes 114 and preventing play of the guide members.

Figure 5:
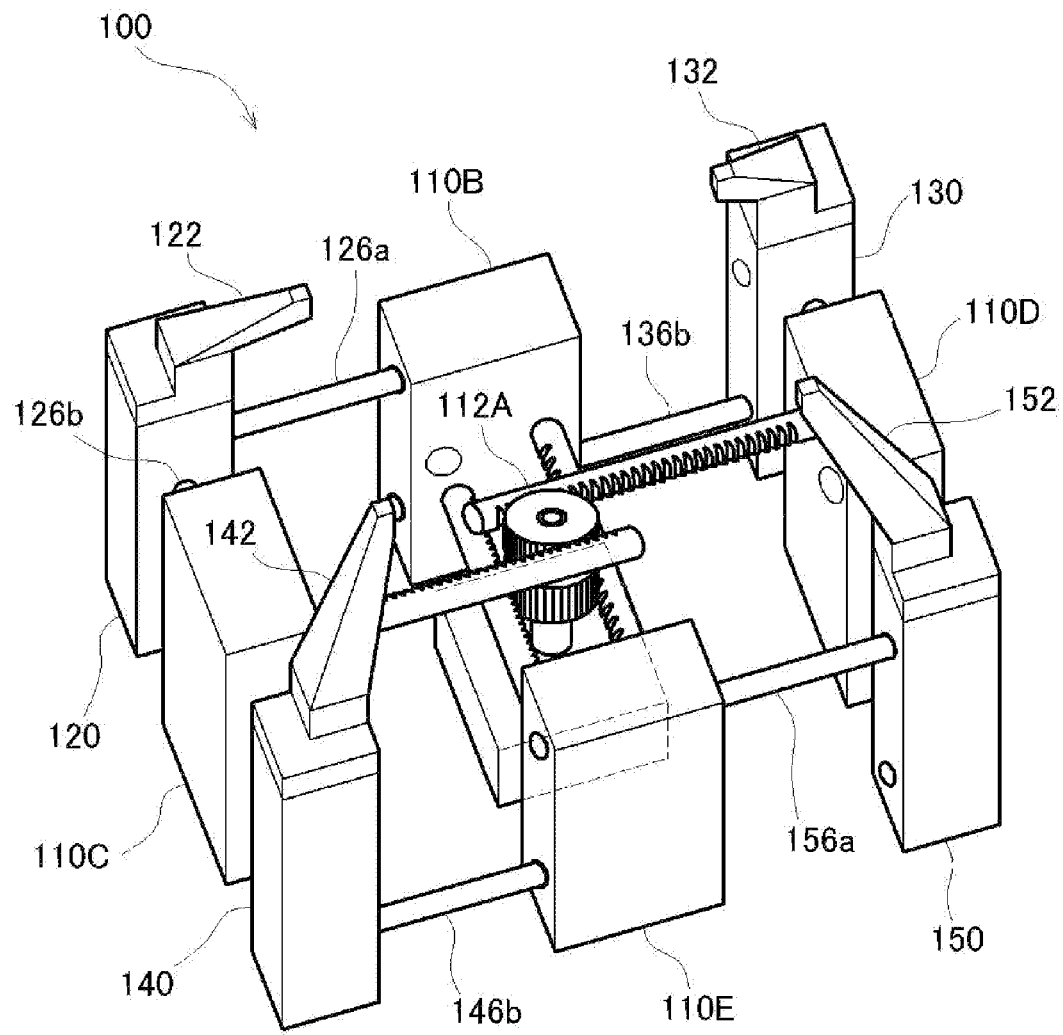
FIG. 5 is an explanatory diagram showing the operation of the robot hand according to the modification.
Figure 6:
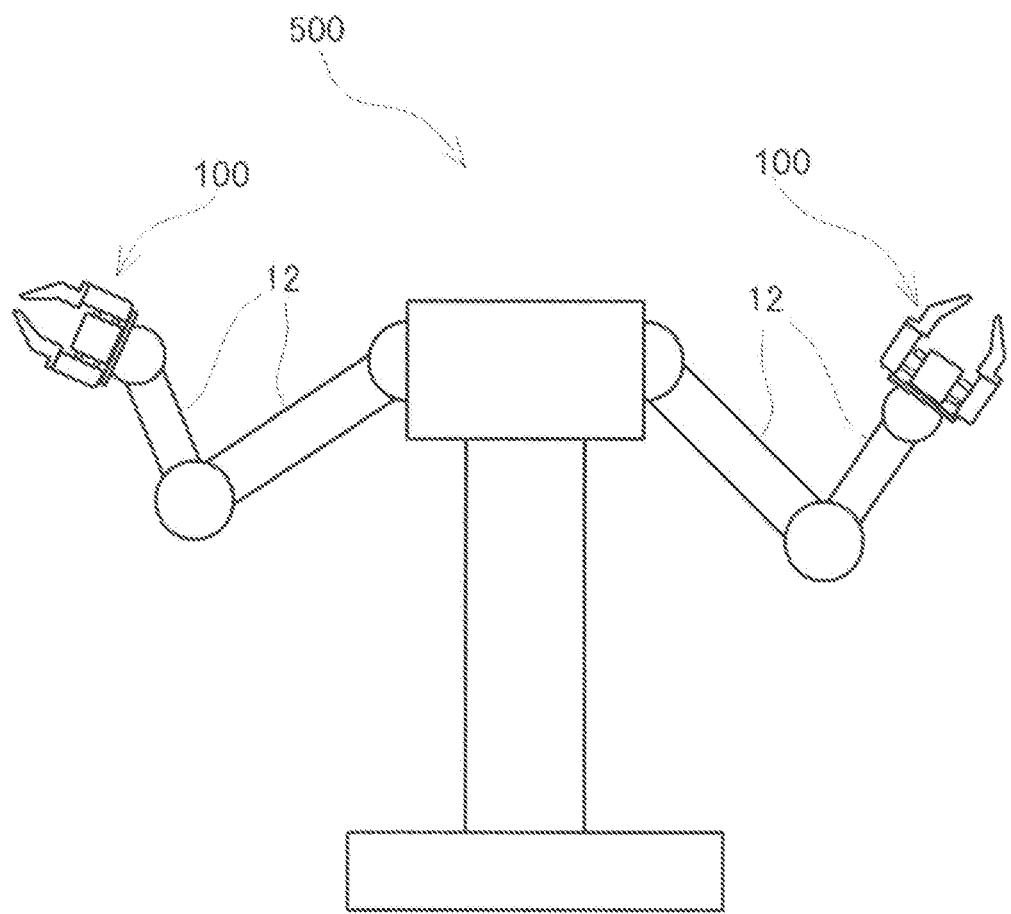
FIG. 6 is an explanatory diagram showing a robot including the robot hand according to the embodiment.

FIG. 5 is an explanatory diagram showing the operation of the robot hand 100 according to the modification. For example, when the pinion gear 112A on the upper side provided in the center palm member 110A is rotated in the clockwise direction on the figure, a space between the peripheral palm member 110C and the peripheral palm member 110D increases. Then, the moving member 120 and the moving member 140 are moved in a direction same as the moving direction of the peripheral palm member 110C by the guide member 126b (a guide member vertically provided from the moving member 120 to the peripheral palm member 110C) and the guide member 146a (a guide member vertically provided from the moving member 140 to the peripheral palm member 110C) fit in the peripheral palm member 110C. At this point, the other guide member (the guide member 126a) vertically provided on the moving member 120 and the other guide member (the guide member 146b) vertically provided on the moving member 140 guide the direction in which the moving member 120 and the moving member 140 move according to the movement of the peripheral palm member 110C.

The same holds true for the peripheral palm member 110D. Specifically, when the peripheral palm member 110D moves, the moving member 130 and the moving member 150 are moved in a direction same as the moving direction of the peripheral palm member 110D by the guide member 136a (a guide member vertically provided from the moving member 130 to the peripheral palm member 110D) and the guide member 156b (a guide member vertically provided from the moving member 150 to the peripheral palm member 110D) fit in the peripheral palm member 110D. At this point, the other guide member (the guide member 136b) vertically provided on the moving member 130 and the other guide member (the guide member 156a) vertically provided on the moving member 150 guide the direction in which the moving member 130 and the moving member 150 move according to the movement of the peripheral palm member 110D. The moving direction explained above (the direction in which the peripheral palm member 110C and the peripheral palm member 110D move close to and away from each other) is referred to as "X axial direction".

The same operation is performed when the pinion gear 112B on the lower side provided in the center palm member 110A is rotated. The operation is briefly explained below. Since the rack 114B and the rack 114E mesh with the pinion gear 112B on the lower side as explained above (see FIG. 4), the peripheral palm member 110B and the peripheral palm member 110E move in opposite directions. Since the guide member 126a from the moving member 120 and the guide member 136b from the moving member 130 are fit in the peripheral palm member 110B, the moving member 120 and the moving member 130 move in a direction same as the moving direction of the peripheral palm member 110B. At this point, the other guide member (the guide member 126b) vertically provided on the moving member 120 and the other guide member (the guide member 136a) vertically provided on the moving member 130 guide the direction in which the moving member 120 and the moving member 130 move according to the movement of the peripheral palm member 110B. Similarly, the moving member 140 and the moving member 150 move according to the movement of the peripheral palm member 110E. At this point, the guide member 146a vertically provided from the moving member 140 to the peripheral palm member 110C and the guide member 156b vertically provided from the moving member 150 to the peripheral palm member 110D guide the movement of the moving member 140 and the moving member 150. The moving direction explained above (the direction in which the peripheral palm member 110B and the peripheral palm member 110E move close to and away from each other) is referred to as "Y axial direction".

As explained above, in the robot hand 100 according to the modification, the moving members 120, 130, 140, and 150 can be moved in the X axial direction and the Y axial direction. Therefore, it is possible to change spaces among the finger members 122, 132, 142, and 152 respectively provided in the moving members 120, 130, 140, and 150 and grip objects having various sizes. In the modification explained above, the X axial direction corresponds to "first predetermined axial direction" according to the invention and the Y axial direction corresponds to "second predetermined axial direction" according to the invention. The peripheral palm member 110C and the peripheral palm member 110D correspond to "first peripheral palm member" according to the invention and the peripheral palm member 110B and the peripheral palm member 110E correspond to "second peripheral palm member" according to the invention.

On the moving members 120, 130, 140, and 150, guide members are vertically provided in the X axial direction and the Y axial direction. When the moving members 120, 130, 140, and 150 are moved in one axial direction (e.g., the X axial direction), the moving members 120, 130, 140, and 150 are pushed and moved by the guide members in the other axial direction (e.g., the Y axial direction) while being guided by the guide members in one axial direction. Since the respective guide members are vertically provided from the moving members 120, 130, 140, and 150, the guide members move according to the movement of the moving members 120, 130, 140, and 150. Therefore, in the robot hand 100 according to the modification, as in the robot hand 100 according to the embodiment, when the peripheral palm members 110B, 110C, 110D, and 110E are moved close to the center palm member 110A in an attempt to grasp a small object, the size of the robot hand 100 is reduced. As a result, the robot hand 100 can be suitably used for work for gripping a small object in a narrow work space, although the robot hand 100 adopts the system for translating the moving member 120 provided with the finger members 122, the moving member 130 provided with the finger members 132, the moving member 140 provided with the finger member 142, and the moving member 150 provided with the finger member 152 to grip an object.

The robot hands according to the embodiments are explained above. However, the invention is not limited to all the embodiment and modification and can be carried out in various forms without departing from the spirit of the invention.

For example, if the robot hand 100 according to the embodiment or the modification is mounted on the distal end of a robot arm 12 to configure a robot 500, it is possible to obtain the robot 500 that can be suitably applied to work for gripping a small object in a narrow work space while being capable of handling various objects.

The entire disclosure of Japanese Patent Application No. 2011-003721, filed Jan. 12, 2011 is expressly incorporated by reference herein.

What is claimed is:
1. A robot hand, comprising:
a first palm member;
a second palm member;
a first moving member movably attached to the first palm member;
a first finger attached to the first moving member;
a second moving member movably attached to the first palm member;
a second finger attached to the second moving member;
a third moving member movably attached to the second palm member;
a third finger attached to the third moving member;
a fourth moving member movably attached to the second palm member;
a fourth finger attached to the fourth moving member;
a moving mechanism moving the first and second palm members relative to each other in a first direction;
a third palm member located between the first moving member and the third moving member; and a fourth palm member located between the second moving member and the fourth moving member, wherein the first palm member is located between the first moving member and the second moving member, and the second palm member is located between the third moving member and the fourth moving member, each of the first and second palm members is non-gripping, at least two of the first, second, third and fourth fingers are configured to grip an object, the moving mechanism moves the third and fourth palm members relative to each other in a second direction substantially orthogonal to the first direction, and each of the third and fourth palm members is non-gripping.

2. The robot hand according to claim 1, further comprising:
a fifth palm member attached to the moving mechanism.

3. The robot hand according to claim 1, wherein
a distance between a gripping surface of the first finger and a gripping surface of the second finger is shorter than a distance between a side surface of the first moving member and a side surface of the second moving member, and a distance between a gripping surface of the third finger and a gripping surface of the fourth finger is shorter than a distance between a side surface of the third moving member and a side surface of the fourth moving member.

4. The robot hand according to claim 1, wherein
each of the gripping surfaces of the first, second, third and fourth fingers is substantially orthogonal to the first direction.

5. The robot hand according to claim 1, wherein
the moving mechanism is configured with a rack that has cut teeth and a pinion gear that is meshed with the rack.

6. The robot hand according to claim 5, wherein
the rack has a first rack element attached to the first palm member and a second rack element attached to the second palm member.

7. The robot hand according to claim 5,
the rack has a third rack element attached to the third palm member and a fourth rack element attached to the fourth palm member, and
the third rack element is substantially orthogonal to the first rack element and the fourth rack element is substantially orthogonal to the second rack element.

8. The robot hand according to claim 7, wherein
the pinion gear has a first pinion gear which is meshed with both the first and second rack elements, and a second pinion gear which is meshed with both the third and fourth rack elements, and
the first and second pinion gears are substantially coaxial.

9. A robot mounted with the robot hand according to claim 1.

10. A robot hand, comprising:
a first palm member;
a second palm member;
a first moving member movably attached to the first palm member;
a first finger attached to the first moving member;
a second moving member movably attached to the first palm member;
a second finger attached to the second moving member;
a third moving member movably attached to the second palm member;
a third finger attached to the third moving member;
a fourth moving member movably attached to the second palm member;
a fourth finger attached to the fourth moving member;
a moving mechanism moving the first and second palm members relative to each other in a first direction;
a first guide member extending between the first palm member and the first moving member;
a second guide member extending between the first palm member and the second moving member;
a third guide member extending between the second palm member and the third moving member; and
a fourth guide member extending between the second palm member and the fourth moving member, wherein
the first palm member is located between the first moving member and the second moving member and the second palm member is located between the third moving member and the fourth moving member,
each of the first and second palm members is non-gripping, and
at least two of the first, second, third and fourth fingers are configured to grip an object.

11. The robot hand according to claim 10, wherein
a distance between a gripping surface of the first finger and a gripping surface of the second finger is shorter than a distance between a side surface of the first moving member and a side surface of the second moving member, and a distance between a gripping surface of the third finger and a gripping surface of the fourth finger is shorter than a distance between a side surface of the third moving member and a side surface of the fourth moving member.

12. The robot hand according to claim 10, wherein
each of the gripping surfaces of the first, second, third and fourth fingers is substantially orthogonal to the first direction.

13. The robot hand according to claim 10, wherein
the moving mechanism is configured with a rack that has cut teeth and a pinion gear that is meshed with the rack.

14. The robot hand according to claim 13, wherein
the rack has a first rack element attached to the first palm member and a second rack element attached to the second palm member.

15. The robot hand according to claim 13, further comprising:
a third palm member located between the first moving member and the third moving member; and
a fourth palm member located between the second moving member and the fourth moving member, wherein
the rack has a third rack element attached to the third palm member and a fourth rack element attached to the fourth palm member, and
the third rack element is substantially orthogonal to the first rack element and the fourth rack element is substantially orthogonal to the second rack element.

16. The robot hand according to claim 15, wherein
the pinion gear has a first pinion gear which is meshed with both the first and second rack elements, and a second pinion gear which is meshed with both the third and fourth rack elements, and
the first and second pinion gears are substantially coaxial.

17. A robot mounted with the robot hand according to claim 10.

* * * * *